United States Patent [19]
Pickett et al.

[11] Patent Number: 6,101,595
[45] Date of Patent: *Aug. 8, 2000

[54] FETCHING INSTRUCTIONS FROM AN INSTRUCTION CACHE USING SEQUENTIAL WAY PREDICTION

[75] Inventors: James K. Pickett; Thang M. Tran, both of Austin, Tex.

[73] Assignee: Advanced Micro Devices, Inc., Sunnyvale, Calif.

[*] Notice: This patent is subject to a terminal disclaimer.

[21] Appl. No.: 09/246,270

[22] Filed: Feb. 8, 1999

Related U.S. Application Data

[63] Continuation of application No. 08/873,113, Jun. 11, 1997.

[51] Int. Cl.⁷ ...................................................... G06F 15/00

[52] U.S. Cl. .......................... 712/205; 712/206; 712/207; 712/208; 712/23; 711/125; 711/128; 711/137

[58] Field of Search ..................................... 712/205, 206, 712/207, 208, 23; 711/125, 128, 137

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,764,861 | 8/1988 | Shibuya | 712/207 |
| 4,807,115 | 2/1989 | Torng | 712/215 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2 674 044 | 9/1992 | France . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.
International Search Report for PCT/US96/11755 dated Feb. 26, 1997.

(List continued on next page.)

*Primary Examiner*—Meng-Ai T. An
*Assistant Examiner*—Nabil El-Hady
*Attorney, Agent, or Firm*—Conley, Rose & Tayon, PC; B. Noel Kivlin; Larry J. Merkel

[57] ABSTRACT

An instruction fetch unit that employs sequential way prediction. The instruction fetch unit comprises a control unit configured to convey a first index and a first way to an instruction cache in a first clock cycle. The first index and first way select a first group of contiguous instruction bytes within the instruction cache, as well as a corresponding branch prediction block. The branch prediction block is stored in a branch prediction storage, and includes a predicted sequential way value. The control unit is further configured to convey a second index and a second way to the instruction cache in a second clock cycle succeeding the first clock cycle. This second index and second way select a second group of contiguous instruction bytes from the instruction cache. The second way is selected to be the predicted sequential way value stored in the branch prediction block corresponding to the first group of contiguous instruction bytes in response to a branch prediction algorithm employed by the control unit predicting a sequential execution path. Advantageously, a set associative instruction cache utilizing this method of way prediction may operate at higher frequencies (i.e., lower clock cycles) than if tag comparison were used to select the correct way.

20 Claims, 10 Drawing Sheets

U.S. PATENT DOCUMENTS

| | | | |
|---|---|---|---|
| 4,853,840 | 8/1989 | Shibuya | 712/237 |
| 4,858,105 | 8/1989 | Kuriyama et al. | 712/235 |
| 4,928,223 | 5/1990 | Dao et al. | 712/247 |
| 4,943,908 | 7/1990 | Emma et al. | 712/240 |
| 4,984,154 | 1/1991 | Hanatani et al. | 712/240 |
| 5,053,631 | 10/1991 | Perlman et al. | 708/508 |
| 5,058,048 | 10/1991 | Gupta et al. | 708/508 |
| 5,129,067 | 7/1992 | Johnson | 712/213 |
| 5,136,697 | 8/1992 | Johnson | 711/137 |
| 5,142,634 | 8/1992 | Fite et al. | 712/240 |
| 5,185,868 | 2/1993 | Tran | 712/217 |
| 5,226,126 | 7/1993 | McFarland et al. | 712/218 |
| 5,226,130 | 7/1993 | Favor et al. | 712/238 |
| 5,230,068 | 7/1993 | Van Dyke et al. | 711/137 |
| 5,235,697 | 8/1993 | Steely, Jr. et al. | 712/239 |
| 5,283,873 | 2/1994 | Steely, Jr. et al. | 712/207 |
| 5,327,547 | 7/1994 | Stiles et al. | 711/137 |
| 5,345,569 | 9/1994 | Tran | 712/217 |
| 5,381,533 | 1/1995 | Peleg et al. | 712/215 |
| 5,418,922 | 5/1995 | Liu | 711/3 |
| 5,423,011 | 6/1995 | Blaner et al. | 712/240 |
| 5,442,760 | 8/1995 | Rustad et al. | 712/215 |
| 5,454,117 | 9/1995 | Puziol et al. | 712/23 |
| 5,485,587 | 1/1996 | Matsuo et al. | 712/234 |
| 5,640,532 | 6/1997 | Thome et al. | 711/128 |
| 5,701,435 | 12/1997 | Chi | 711/159 |
| 5,752,069 | 5/1998 | Roberts et al. | 712/23 |
| 5,752,259 | 5/1998 | Tran | 711/125 |
| 5,764,946 | 6/1998 | Tran | 712/239 |
| 5,819,059 | 10/1998 | Tran | 712/213 |
| 5,822,558 | 10/1998 | Tran | 712/213 |
| 5,848,433 | 12/1998 | Tran et al. | 711/137 |

OTHER PUBLICATIONS

XP 000525181 Calder, et al, "Next Cache Line and Set Prediction," Department of Computer Science, University of Colorado, 8345 Computer Architecturen News, May 23, 1995, No. 2, pp. 287–296.

XP 000397920 Uchiyama, et al, "The Gmicro/500 Superscaler Microprocessor with Branch Buffers," 8207 IEEE Micro, Oct. 13, 1993, No. 5, pp. 12–22.

Branch Selector Encodings

| Encoding (Binary) | Branch Prediction |
|---|---|
| 00 | Sequential |
| 01 | Return Stack |
| 10 | Branch Prediction 1 (BP1) |
| 11 | Branch Prediction 2 (BP2) |

FETCHING INSTRUCTIONS FROM AN INSTRUCTION CACHE USING SEQUENTIAL WAY PREDICTION

This application is a continuation of No. 08/873,113 filed Jun. 11, 1997.

BACKGROUND OF THE INVENTION

1. Field of the Invention

This invention relates to the field of microprocessors and, more particularly, to an instruction fetch unit within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

A pipelined microprocessor achieves increased performance over a non-pipelined implementation by executing portions of several instructions concurrently. The overall time to execute a given instruction is the same in both cases, but the pipelined approach decreases the average number of clock cycles per instruction (CPI). For example, consider a scalar microprocessor with four pipeline stages: instruction fetch, decode, execute, and write back. Given an instruction stream with no data dependencies, a first instruction enters the instruction fetch stage in the first clock cycle. In the next clock cycle, this first instruction enters the decode stage, while a second instruction enters instruction fetch. A third and fourth instruction enter the instruction fetch stage in a third and fourth clock cycle, respectively. By the end of this fourth clock cycle, the first instruction is complete, having finished the write back stage. Additionally, the second instruction has finished the execute stage, while the third and fourth instruction are in decode and instruction fetch, respectively. At this point in time, the CPI of the microprocessor is four (four cycles to complete one instruction). With each successive clock cycle, however, an additional instruction completes, lowering the CPI. In the ideal case (again assuming no data dependencies), the CPI of the processor will approach one. Theoretically, a superscalar microprocessor can achieve a CPI less than one by executing more than one instruction concurrently.

Such performance can only be attained, however, if all pipeline stages are performing useful work in every clock cycle. Actual instruction streams contain various dependencies which may prevent one or more pipeline stages from performing work in a particular clock cycle. Each dependency may introduce a "bubble" into the pipeline (also referred to as "stalling" the pipeline). In the example above, if the second instruction were not fetched until the third clock cycle, a bubble would exist in the instruction fetch stage in the second clock cycle. This bubble propagates through the pipeline, since the decode and subsequent stages cannot be performed until the fetch for a particular instruction is complete. To maximize efficiency, then, various techniques are employed in pipelined microprocessors to minimize stalling.

An important part of the pipeline of a superscalar microprocessor (and a superpipelined microprocessor as well) is the instruction fetch stage. If instructions cannot be fetched and supplied to subsequent stages at a sufficient rate, this creates a bottleneck in the pipeline. It is particularly difficult to supply an uninterrupted flow of instructions when changes in the path of the instruction stream, called branches, are present. A branch instruction is an instruction which causes subsequent instructions to be fetched from one of at least two addresses: a sequential address identifying an instruction stream beginning with instructions which immediately follow the branch instruction; and a target address identifying an instruction stream beginning at an arbitrary location in memory. An unconditional branch instruction always branches to the target address, while a conditional branch may select either the sequential or target address based on the outcome of a prior instruction. Conditional branches make the flow of the instruction stream dependent on program execution, and therefore less predictable than sequential execution.

When the outcome of a conditional branch instruction is not known, the pipeline may stall and wait until the branch is resolved. To improve performance, though, a branch prediction unit may be employed to try to "guess" which way the branch will resolve. For example, if the branch prediction unit predicts a particular branch will not be taken, it supplies instructions immediately following the branch in memory to the subsequent pipeline stages. This is known as predicting a sequential execution path. Alternatively, if the branch prediction unit predicts the particular branch to be taken, instructions beginning at the target address are furnished to subsequent pipeline stages. This is known as predicting a taken branch path. If the branch prediction unit correctly predicts the outcome of the branch, the CPI of the processor is advantageously decreased. If the prediction is incorrect, though, the instructions in the pipeline from the mispredicted stream are discarded, and the correct instructions are fetched. This degrades processor performance by increasing CPI. It is thus imperative that a branch prediction mechanism be as accurate as possible.

Another technique used to speed up instruction fetching is the use of instruction caches. A cache is a level of memory hierarchy between the processor and main memory. Although it has less capacity than main memory, it can be accessed more quickly. Because some program instructions tend to be executed more frequently than others, instruction fetch time can be advantageously decreased by storing these frequently-accessed instructions in an instruction cache.

A cache is organized as an array of groups of contiguous bytes, called cache lines. The number of bytes in a cache line for a given cache is a fixed number called the cache line size. The intersection of each row and column within the array contains a cache line. The byte capacity of the cache can thus be calculated by multiplying the number of rows, the number of columns, and the line size of the cache.

Because caches have a smaller capacity than main memory, a different addressing scheme is typically used. A subset of the full number of address bits is used to form an index into the cache, which uniquely identifies a row within the cache. A number of lower order address bits are additionally used as an offset address to select a byte within the row. The portion of the full address not used in forming the index or offset is known as the tag value, and is used to insure the proper cache line has been accessed.

Caches having one column (or "way") are called direct-mapped caches, meaning a given cache line can exist only one place in the cache. Caches with more than one way are called set associative caches. A cache organized with four cache lines per index is known as a four-way set associative cache. Set associative caches tend to have a higher percentage of successful accesses than direct-mapped caches of the same size. (A successful access to a cache is one in which the cache can satisfy a request for a given address without having to fetch the cache line from memory. A successful access is also known as a "hit"; conversely, an unsuccessful access is known as a "miss".) The set associative hit rates are generally higher because these caches can store multiple blocks that map to the same index.

The downside of set associative caches, however, is increased access time. This is due to the increased time of tag comparison over a direct-mapped cache. In a direct-mapped cache, only one tag value must be compared to the upper-order instruction address bits. In a n-way set associate cache, however, n tags must be compared to the upper-order bits, with the result used to select the appropriate way. The compare and select logic increases both hardware complexity and access time. As processor frequencies increase (and cycle times decrease), it becomes more difficult to complete the access to a set associative instruction cache in one clock cycle, even for cases in which the sequential address is predicted via the branch prediction mechanism.

SUMMARY OF THE INVENTION

The problems outlined above are in large part solved by an instruction fetch unit in accordance with the present invention. In one embodiment, an instruction fetch unit is provided which employs sequential way prediction. The instruction fetch unit comprises a control unit configured to convey a first index and a first way to an instruction cache in a first clock cycle. The first index and first way select a first group of contiguous instruction bytes within the instruction cache, as well as a corresponding branch prediction block. The branch prediction block is stored in a branch prediction storage, and includes a predicted sequential way value. The control unit is further configured to convey a second index and a second way to the instruction cache in a second clock cycle succeeding the first clock cycle. This second index and second way select a second group of contiguous instruction bytes from the instruction cache. The second way is selected to be the predicted sequential way value stored in the branch prediction block corresponding to the first group of contiguous instruction bytes in response to a branch prediction algorithm employed by the control unit predicting a sequential execution path. Advantageously, a set associative instruction cache utilizing this method of way prediction may operate at higher frequencies (i.e., lower clock cycles) than if tag comparison were used to select the correct way.

Broadly speaking, the present invention contemplates an instruction fetch unit comprising a control unit configured to convey a first index and a first way to an instruction cache in a first clock cycle. The first index and the first way select a first group of contiguous instruction bytes within the instruction cache. The instruction fetch unit further comprises a branch prediction storage configured to convey a branch prediction block including a predicted sequential way value to the control unit in response to receiving the first index and the first way concurrent with the instruction cache. The control unit is configured to convey a second index and a second way to the instruction cache in a second clock cycle succeeding the first clock cycle, wherein the second index and the second way select a second group of contiguous instruction bytes within the instruction cache. The second way is selected to be the predicted sequential way value in response to a branch prediction algorithm employed by the control unit predicting a sequential execution path.

The present invention further contemplates an instruction fetch unit comprising a control unit configured to convey a first index and a first way to an instruction cache in a first clock cycle, wherein the first index and the first way select a first group of contiguous instruction bytes within the instruction cache. The instruction fetch unit further comprises a branch prediction storage configured to convey a branch prediction block to the control unit in response to receiving the first index and the first way concurrent with the instruction cache. The branch prediction block includes a predicted sequential way value and a first predicted branch index value and a first predicted branch way value. The control unit is configured to convey a second index and a second way to the instruction cache in a second clock cycle succeeding the first clock cycle, wherein the second index and the second way select a second group of contiguous instruction bytes within the instruction cache. The second way is selected to be the predicted sequential way value in response to a branch prediction algorithm employed by the control unit predicting a sequential execution path. Furthermore, the second index is selected to be the first predicted branch index value, and the second way is selected to be the first predicted branch way value in response to the branch prediction algorithm predicting a first taken branch within the first group of contiguous instruction bytes.

The present invention still further contemplates a microprocessor comprising an instruction cache configured to store a plurality of cache lines of instruction bytes and to provide a group of instruction bytes upon receipt of an index address and a way address to an instruction processing pipeline of the microprocessor. The microprocessor comprises a branch prediction unit coupled to the instruction cache and coupled to receive the index address and the way address concurrent with the instruction cache. The branch prediction unit is configured to provide a sequential way corresponding to the group of instruction bytes in response to the index address and the way address. The sequential way is used as a subsequent way address by the instruction cache in response to the branch prediction unit predicting a sequential execution path.

BRIEF DESCRIPTION OF THE DRAWINGS

Other objects and advantages of the invention will become apparent upon reading the following detailed description and upon reference to the accompanying drawings in which:

FIG. 7 is a table showing an exemplary encoding of a branch selector.

Figure 1:
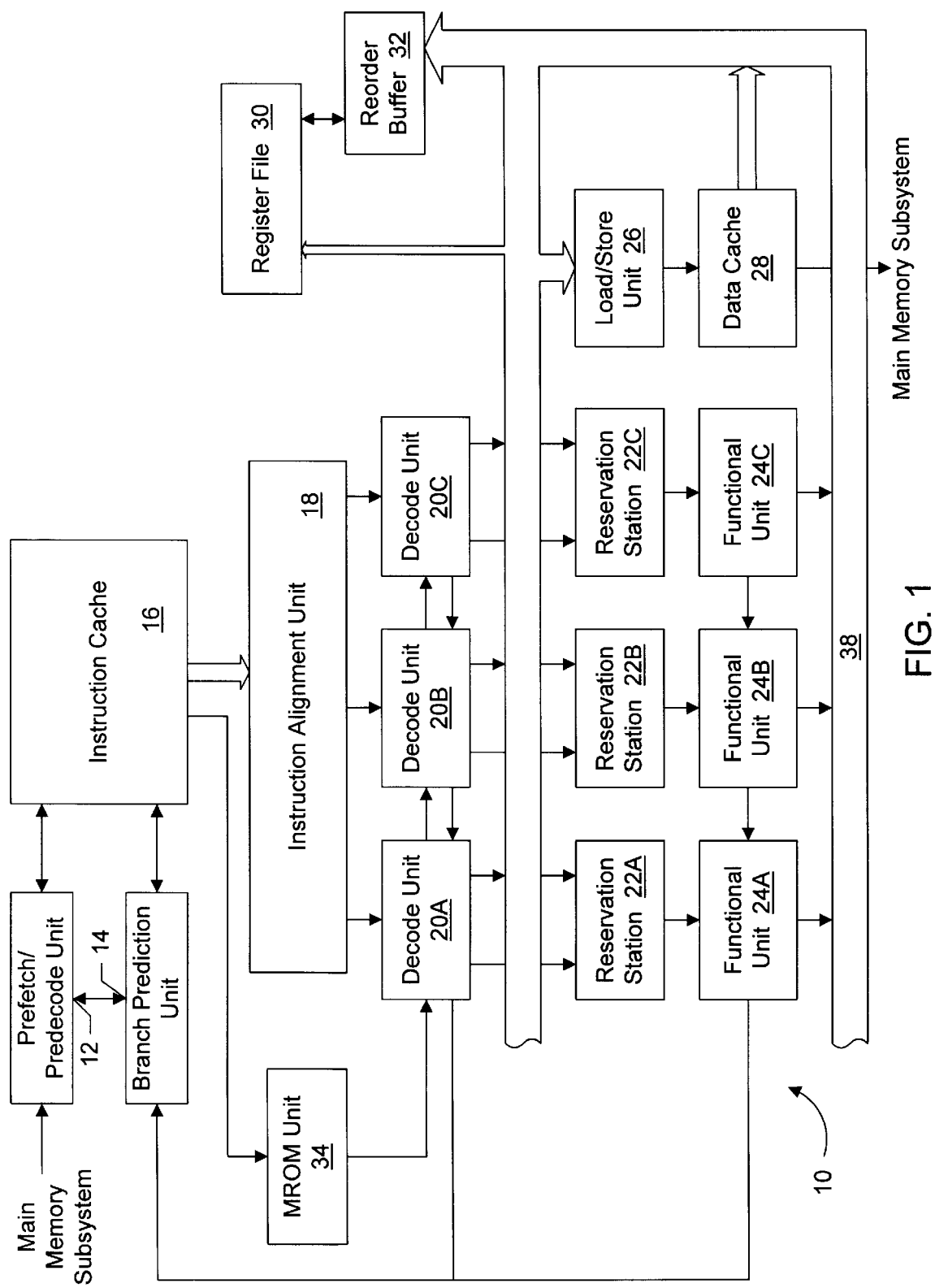
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, set associative instruction cache 16 employs a way prediction mechanism to achieve single-cycle accesses. To access instruction cache 16, an index and predicted way are provided that correspond to a possible next instruction fetch address. The cache line selected by the given index and the predicted way is read from instruction cache 16. During the next clock cycle after the index and predicted way are provided for this access, the tag compare completes. If the compare is a hit, instruction cache 16 proceeds with the next access. If the compare is a hit to a different way, the instructions conveyed by instruction cache 16 during the previous clock cycle are incorrect. These instructions are discarded and fetched again from the correct way. If the compare misses in all of the ways at the given index, the instructions provided by instruction cache 16 are incorrect, and the correct instructions are fetched from memory.

To increase the accuracy of this way prediction strategy, branch prediction unit 14 employs a cache line based branch prediction mechanism which includes predicted sequential way information. Each cache line in instruction cache 16 has a corresponding branch prediction storage location in branch prediction unit 14. The branch prediction storage location may store multiple branch predictions, which are predicted addresses of the next instruction fetch from instruction cache 16. The branch prediction storage location also stores a branch selector for each byte in the cache line. Each branch selector specifies a particular one of the branch predictions to choose as the next instruction fetch address. The branch prediction assigned to a given byte within a cache line is generally the prediction information corresponding to the first predicted-taken branch instruction encountered within the cache line subsequent to the particular byte identified as the first byte to be fetched by a given fetch address. If no branch instructions are encountered in the cache line subsequent to this byte, a sequential prediction may be indicated by the branch selector. In a sequential access, the previous index presented to instruction cache 16 is incremented (or set to the lowest possible index if the previous index identified the highest possible row in instruction cache 16). Therefore, the branch prediction block supplies a predicted sequential way value to be used by instruction fetch logic in instruction cache 16 in fetching the next sequential address during the succeeding clock cycle.

As used herein, the terms "subsequent" and "prior to" refer to an ordering of bytes within the cache line. A byte stored at a memory address which is numerically smaller than the memory address at which a second byte is stored is prior to the second byte. Conversely, a byte stored at a memory address which is numerically larger than the memory address of a second byte is subsequent to the second byte. Similarly, a first instruction is prior to a second instruction in program order if the first instruction is encountered before the second instruction when stepping one at a time through the sequence of instructions forming the program.

In one embodiment, microprocessor 10 employs a microprocessor architecture in which the instruction set is a variable byte length instruction set (e.g. the x86 microprocessor architecture). When a variable byte length instruction set is employed, any byte within the cache line may be identified as the first byte to be fetched by a given fetch address. For example, a branch instruction may have a target address at byte position two within a cache line. In such a case, the bytes at byte positions zero and one are not being fetched during the current cache access. Since branch selectors are stored for each byte, the branch prediction for a given cache line can be located by selecting the branch selector of the first byte to be fetched from the cache line. The branch selector is used to select the appropriate branch prediction, which is then provided to the instruction fetch logic in instruction cache 16. During the succeeding clock cycle, the branch prediction is used as the fetch address.

It is noted that, although the term "cache line" has been used in the preceding discussion, some embodiments of instruction cache 16 may not provide an entire cache line at its output during a given clock cycle. For example, in one embodiment instruction cache 16 is configured with 32 byte cache lines. However, only 16 bytes are fetched in a given clock cycle (either the upper half or the lower half of the cache line). The branch prediction storage locations and branch selectors are allocated to the portion of the cache line being fetched. As used herein, the term "group of contiguous instruction bytes" is used to refer to the instruction bytes which are provided by the instruction cache in a particular clock cycle in response to a fetch address. A group of contiguous instruction bytes may be a portion of a cache line or an entire cache line, according to various embodiments. When a group of contiguous instruction bytes is a portion of a cache line, it is still an aligned portion of a cache line. For example, if a group of contiguous instruction bytes is half a cache line, it is either the upper half of the cache line or the lower half of the cache line. A number of branch prediction storage locations are allocated to each group of contiguous instruction bytes, and branch selectors indicate one of the branch prediction storage locations associated with that group. Furthermore, branch selectors may indicate a return stack address from a return stack structure if a return instruction is encountered between the corresponding byte and the last byte in the group of contiguous instruction bytes.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
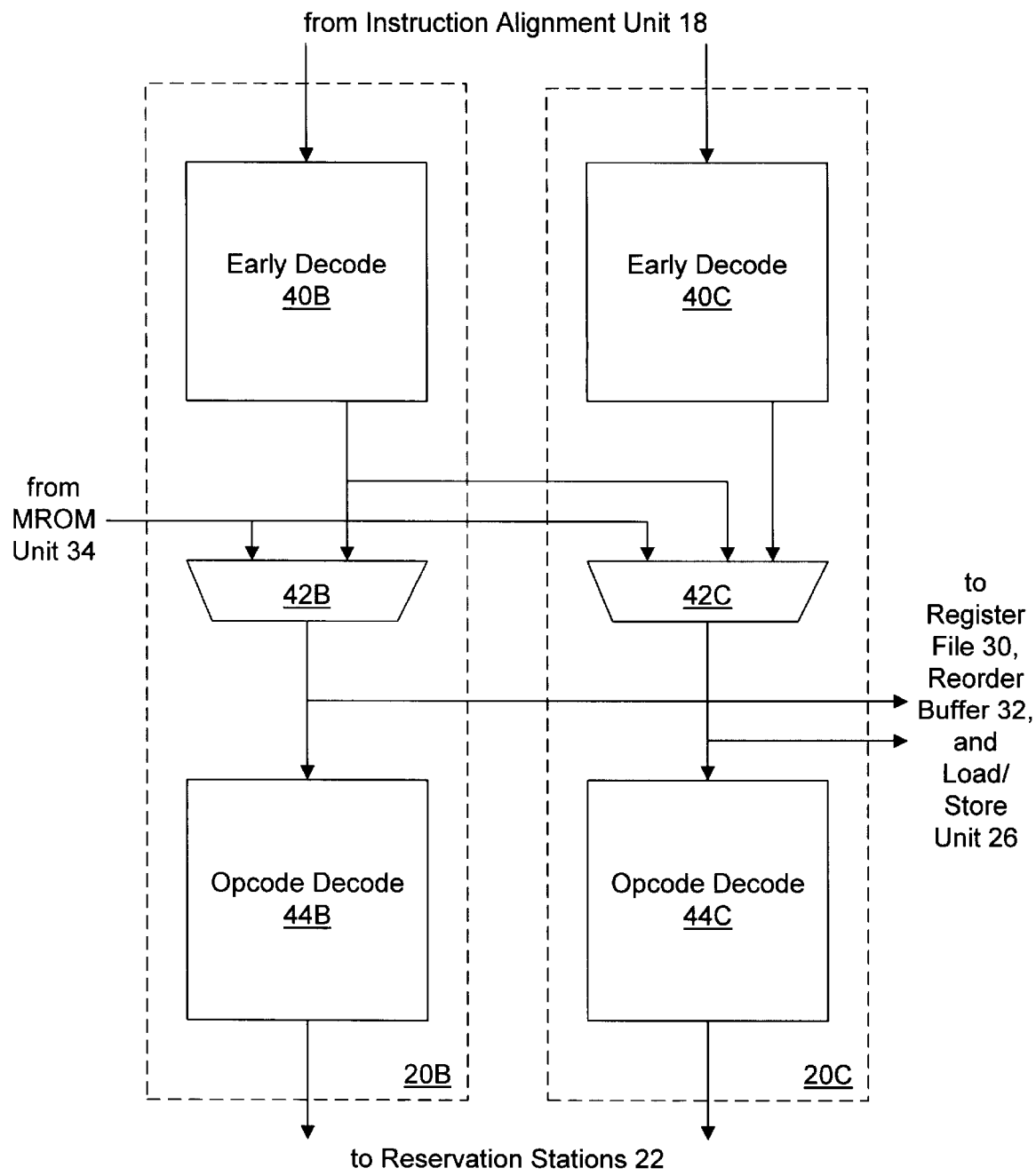
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplex 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
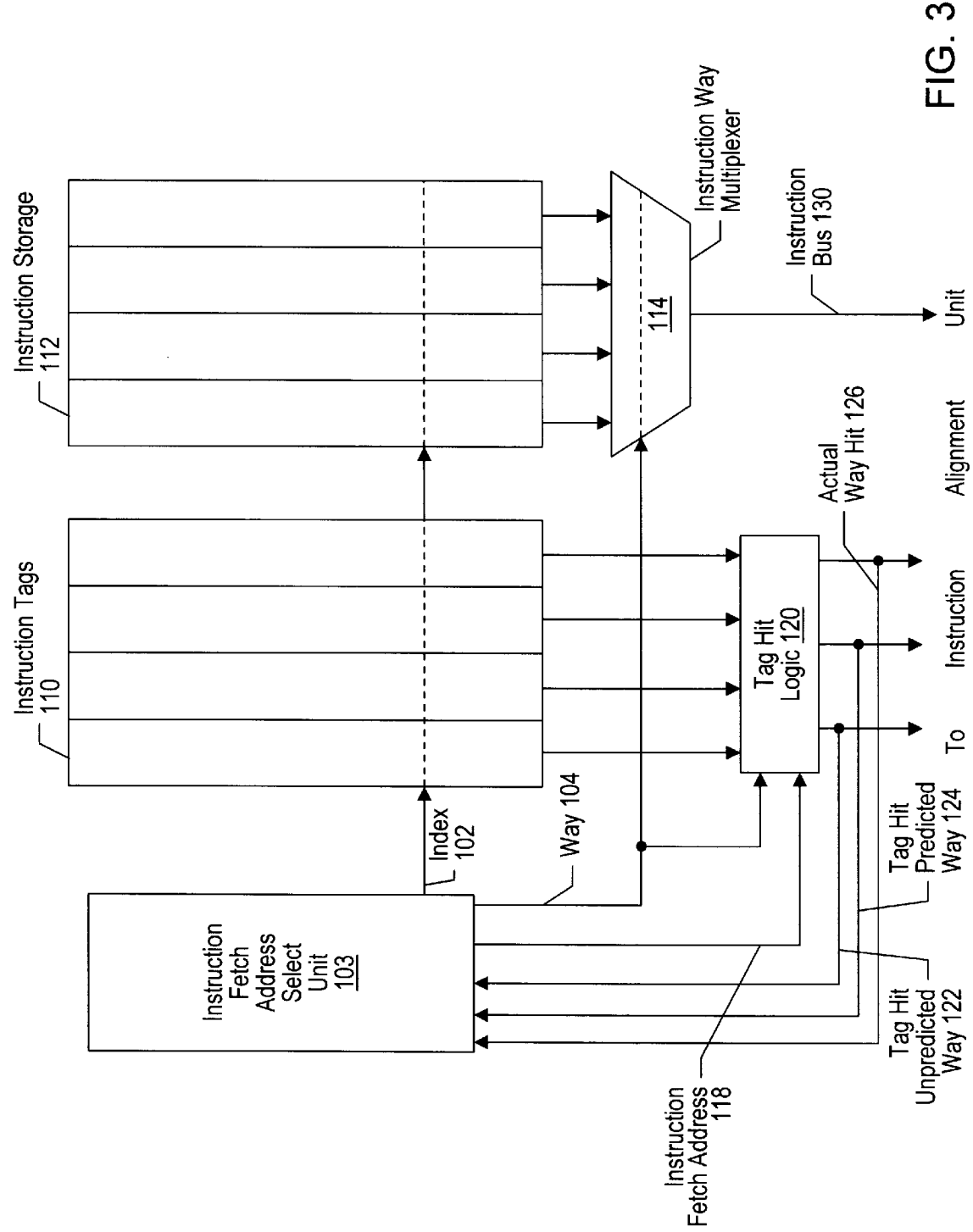
FIG. 3 is a block diagram of portions of one embodiment of the instruction cache shown in FIG. 1.

Turning now to FIG. 3, a block diagram of portions of one embodiment of instruction cache 16 is shown in greater detail. Index 102 is conveyed to instruction tags 110 and instruction storage 112 by an instruction fetch address select unit 103. Way 104 is also conveyed by address select unit 103 to instruction way multiplexer 114 and tag hit logic 120. Instruction way multiplexer 114 is coupled to instruction storage 112, and conveys output to an instruction alignment unit on instruction output bus 130. Tag hit logic 120 is coupled to instruction tags 110 and conveys output to address select unit 103 and the instruction alignment unit, including tag hit unpredicted way signal 122, tag hit predicted way signal 124, and actual way hit signal 126. Additionally, tag hit logic 120 receives an instruction fetch address 118 from instruction fetch address select unit 103.

FIG. 3 illustrates one embodiment of a way prediction mechanism used in conjunction with an instruction cache. Although FIG. 3 depicts a four-way set associative cache, other associativities could be employed. For example, in one embodiment, instruction cache 16 is eight-way set associative. Instruction fetch address select unit 103 supplies index 102 and way 104 to instruction tags 110 and instruction storage 112. Index 102 identifies a row within instruction tags 110 which includes a group of tag values (four, in this case). Index 102 also identifies a corresponding row within instruction storage 112 which includes groups of contiguous instruction bytes. The groups of contiguous instruction bytes are inputs into instruction way multiplexer 114. Way 104, a predicted value conveyed by instruction fetch address select unit 103, selects one of the groups of contiguous instruction bytes to be conveyed to the instruction alignment unit on instruction output bus 130.

Concurrently with way 104 selecting the output of instruction way multiplexer 114, the tag values from instruction tags 110 are each compared with tag bits from instruction fetch address 118. It is noted that the tag bits in an address are those that do not form the index or offset. If none of the tag values match the tag bits from instruction fetch address 118, both tag hit unpredicted way signal 122 and tag hit predicted way signal 124 are de-asserted. This indicates a cache miss. If the tag specified by way 104 matches the tag bits from instruction fetch address 118, then signal tag hit predicted way 124 is asserted. This indicates the way prediction was correct. Finally, if a different tag value other than the one specified by way 104 matches the tag bits from instruction fetch address 118, tag hit unpredicted way signal 122 is asserted and the way that matches is conveyed on actual way hit 126. This indicates that the way prediction was incorrect. The way conveyed on actual way hit 126 can then be used to fetch from the cache at the same index on the succeeding cycle. Alternatively, the inputs to instruction way multiplexer 114 can be latched, and the correct way can be selected in the succeeding clock cycle using actual way hit 126.

As will be described below, index 102 and way 104 may represent a sequential or taken-branch prediction. In one embodiment, instruction fetch address 118 is valid as an input into tag hit logic 120 for a sequential prediction, but not for a taken-branch prediction. Branch mispredictions, including those due to an incorrect way prediction, are determined in functional units 24, when upper-order address bits of-the fetched address are compared with those of the expected target address.

The use of a way prediction strategy as shown in FIG. 3 can decrease the access time to a set associative cache. Since way 104 is provided at the same time as index 102, a group of contiguous instruction bytes can be conveyed to the instruction alignment unit on instruction output bus 130 without having to wait for the output of tag hit logic 120. Since the tag comparison operation is time-consuming, waiting on this logic to provide an output on the instruction bus in one cycle may increase cycle time and may limit the frequency at which microprocessor 10 operates.

If way 104 provided to instruction tags 110 and instruction storage 112 is incorrect, the instructions conveyed to the instruction alignment unit are discarded. The access is then retried with the correct way. Such mispredictions adversely affect the performance of the processor by introducing bubbles into the pipeline. It is thus important that the way prediction mechanism of instruction cache 16 be as accurate as possible. As will be described below, instruction cache 16 contains branch prediction information for each group of contiguous instruction bytes in instruction storage 112. This branch prediction information includes a predicted sequential way value to improve way prediction accuracy if a sequential execution path is selected.

Figure 4:
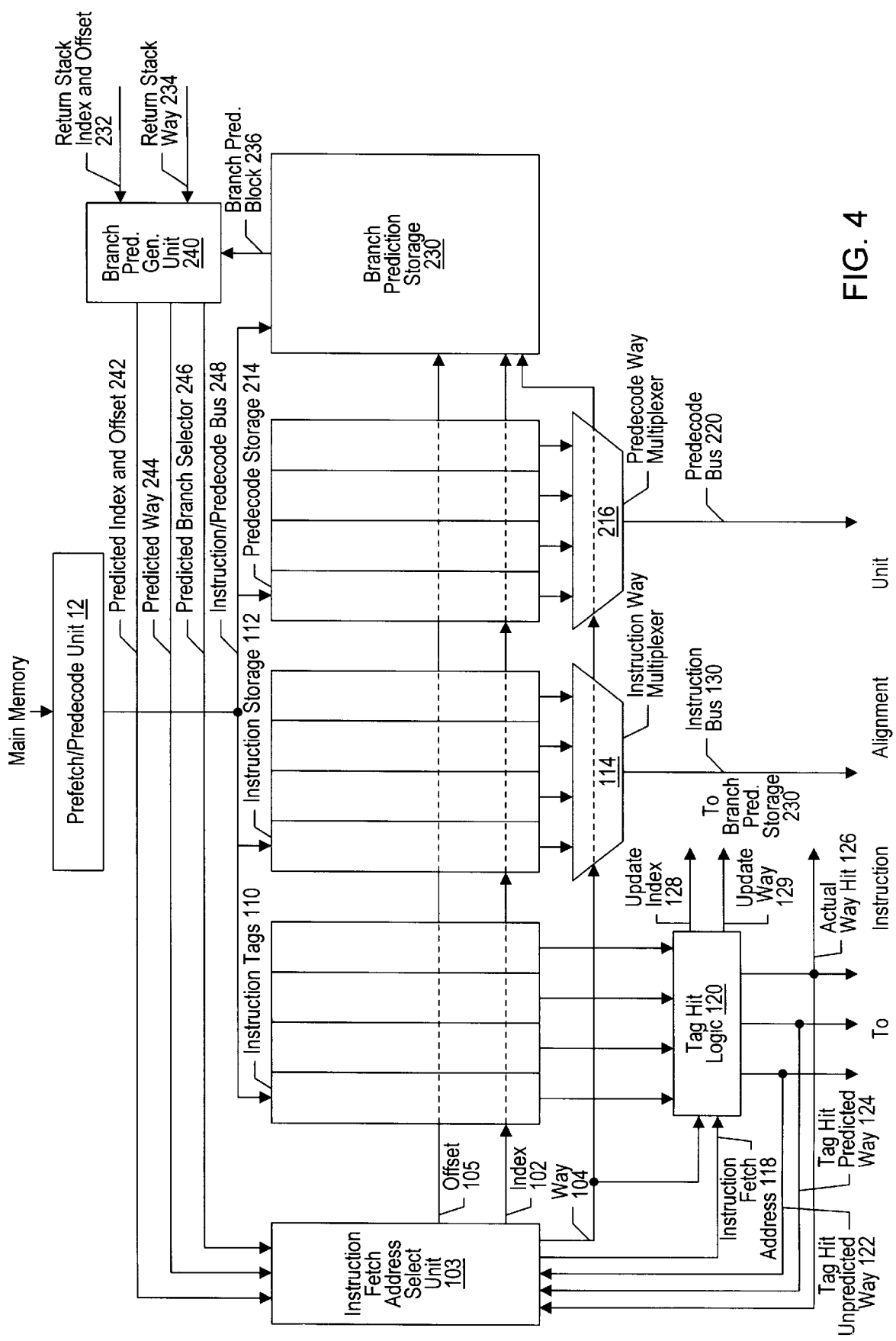
FIG. 4 is a block diagram of portions of one embodiment of the microprocessor shown in FIG. 1.

Turning now to FIG. 4, a block diagram of portions of one embodiment of microprocessor 10 is shown in greater detail. Blocks corresponding to those in FIG. 3 are numbered identically for simplicity and clarity.

In addition to the blocks found in FIG. 3, FIG. 4 includes a predecode storage 214 and a branch prediction storage 230 coupled to receive index 102 and an offset 105. Way 104 is further coupled to a predecode way multiplexer 216 and branch prediction storage 230. Predecode way multiplexer 216 is coupled to receive inputs from predecode storage 214 and to convey an output on a predecode output bus 220. Branch prediction storage 230 is further coupled to a branch prediction generation unit 240 and tag hit logic 120. Branch prediction generation unit 240 receives a return stack index and offset 232, a return stack way 234 and a branch prediction storage block 236 as inputs, and conveys a predicted index and offset 242, a predicted way 244, and a predicted branch selector 246 as outputs to instruction fetch address select unit 103. Additionally, prefetch/predecode unit 12 is coupled to instruction tags 110, instruction storage 112, predecode information 214 and branch prediction storage 230 by an instruction/predecode input bus 248.

As depicted, FIG. 4 illustrates an apparatus for instruction address generation in one embodiment of microprocessor 10. As described above, index 102 and way 104 are conveyed to instruction storage 112 to select a group of contiguous instruction bytes. Concurrently, tag hit logic 120 performs a comparison operation on the tags specified by index 102. Index 102 and way 104 also select predecode information corresponding to the selected group of contiguous instruction bytes. This predecode information is conveyed on predecode output bus 220. Index 102, offset 105 and way 104 further select a branch prediction storage location in branch prediction storage 230 that corresponds to the selected group of contiguous instruction bytes. The selected branch prediction storage location is conveyed to branch prediction generation unit 240 as branch prediction block 236.

Branch prediction generation unit 240 utilizes information included in branch prediction block 236 to convey predicted index and offset 242, predicted way 244, and predicted branch selector 246 to instruction fetch address select unit 103. As will be described in further detail below, a branch prediction may select a sequential execution path, one or more taken-branch paths, or a return path from the return stack. Which of these predictions is chosen depends upon the value of the branch selector corresponding to offset 105. The predicted index for the return stack is provided by return stack index and offset 232, while the predicted way for the return stack is provided by return stack way 234. Branch prediction block 236 includes the appropriate branch selector, one or more predicted branch indices, one or more predicted branch ways, and a predicted sequential way.

Because branch prediction block 236 does not contain a predicted sequential index, the value conveyed on predicted index and offset 242 for a sequential prediction is not valid. For this reason, predicted branch selector 246 is conveyed to instruction fetch address select unit 103. If a value indicating a sequential prediction is conveyed on predicted branch selector 246, this will specify to instruction fetch address select unit 103 that predicted index and offset 242 should not be utilized in generating the index for the next fetch address. Instead, instruction fetch address select unit 103 calculates the next sequential index from the previous value.

Based on the result of the tag comparison operation performed in tag hit logic 120 and the value of predicted branch selector 246, instruction fetch address select unit 103 specifies the next index and way to be presented to instruction cache 16. If the previous way was predicted correctly, information from branch prediction generation unit 240 is used. If a sequential prediction path is indicated by predicted branch selector 246, predicted way 244 is used as the next way 104 to be presented to instruction cache 16. Predicted index and offset 242 is ignored, with the next index 102 being equal to the previous index 102 incremented by one (in the case where the previous index 102 is the last index, the next index 102 will be the first index). If a sequential prediction path is not indicated by predicted branch selector 246, predicted index and offset 242 and predicted way 244 are used for the next values of index 102 and way 104, respectively.

On the other hand, if the previous way was predicted incorrectly, the previous index 102 and actual way hit 126 are used. As will described below, update index 128, update way 129, and actual way 126 are additionally used to update the incorrect way prediction in branch prediction storage 230. If the previous address missed in instruction cache 16, prefetch/predecode unit 12 requests the cache line from main memory. When main memory satisfies the request, prefetch/predecode unit 12 writes the cache line to instruction storage 112, along with instruction tags 110, predecode information 214, and branch prediction storage 230. Additionally, prefetch/predecode unit 12 may receive exception index and exception way inputs (not shown) that override other input indices and ways. The exception inputs may specify a user-visible interrupt, a mispredicted branch, or other change in instruction flow.

As described above, branch prediction storage 230 includes branch prediction blocks that convey information to branch prediction generation unit 240. This information is used to generate a next index 102, a next offset 105, and way 104 to access instruction cache 16. The particular index, offset, and way that are selected in a given clock cycle depends upon the prediction generated by branch prediction generation unit 240 in the preceding clock cycle. Predictions are generated from branch selectors included in the branch prediction block conveyed to branch prediction generation unit 240. Branch selectors and the contents of the branch prediction block are described in detail below.

Figure 5:
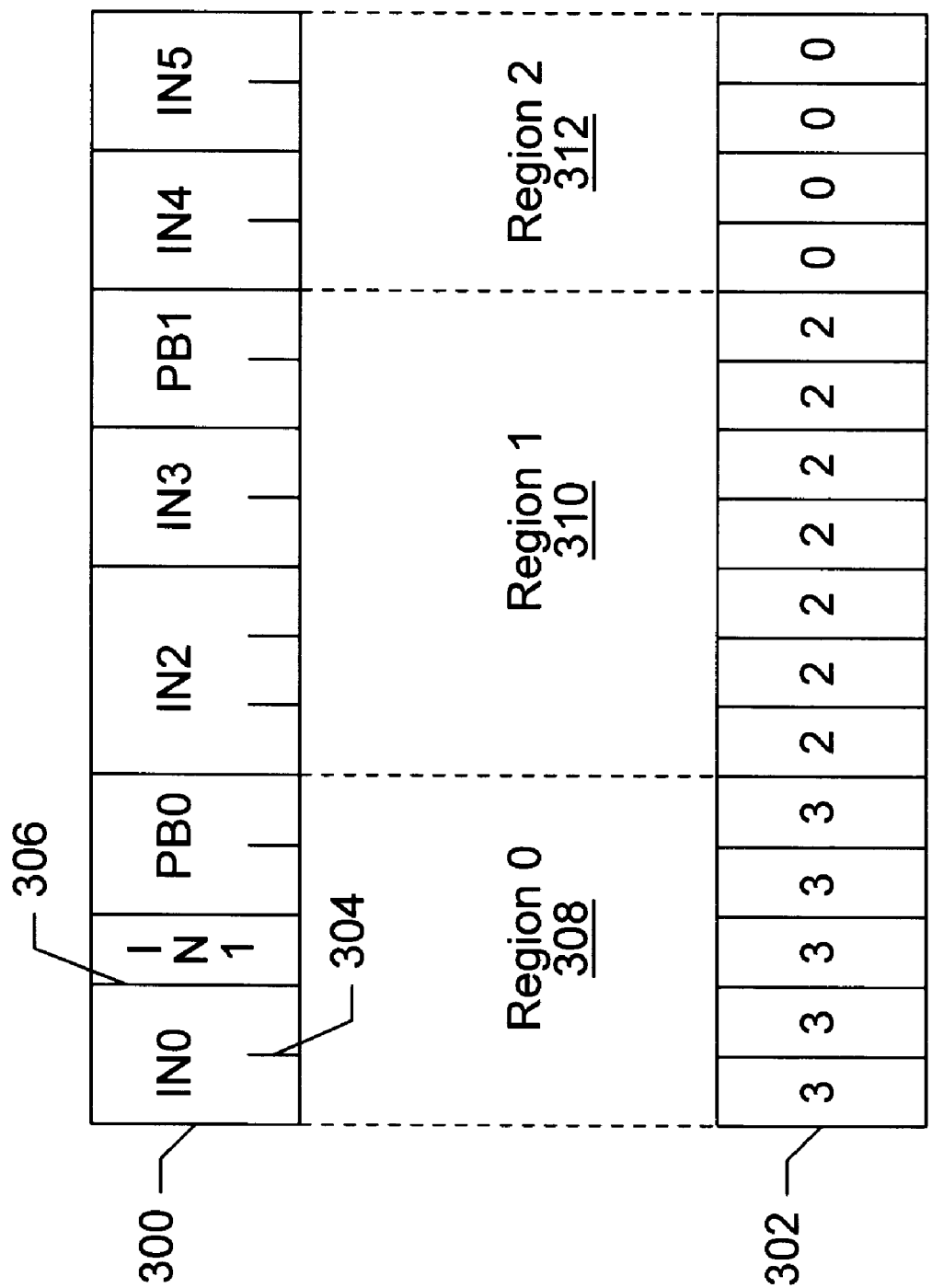
FIG. 5 is a diagram of a group of contiguous instruction bytes and a corresponding set of branch selectors.

Turning now to FIG. 5, a diagram of an exemplary group of contiguous instruction bytes 300 and a corresponding set of branch selectors 302 is shown. In FIG. 5, each byte within an instruction is illustrated by a short vertical line (e.g. reference number 304). Additionally, the vertical lines separating instructions in group 300 delimit bytes (e.g. reference number 306). The instructions shown in FIG. 5 are variable in length, and therefore the instruction set including the instructions shown in FIG. 5 is a variable byte length instruction set. In other words, a first instruction within the variable byte length instruction set may occupy a first number of bytes which is different than a second number of bytes occupied by a second instruction within the instruction set. Other instruction sets may be fixed-length, such that each instruction within the instruction set occupies the same number of bytes as each other instruction.

As illustrated in FIG. 5, group 300 includes non-branch instructions IN0–IN5. Instructions IN0, IN3, IN4, and IN5 are two byte instructions. Instruction IN1 is a one byte instruction and instruction IN2 is a three byte instruction. Two predicted-taken branch instructions PB0 and PB1 are illustrated as well, each shown as occupying two bytes. It is noted that both non-branch and branch instructions may occupy various numbers of bytes.

The end byte of each predicted-taken branch PB0 and PB1 provides a division of group 300 into three regions: a first region 308, a second region 310, and a third region 312. If a fetch address identifying group 300 is presented, and the offset of the fetch address within the group identifies a byte position within first region 308, then the first predicted-taken branch instruction to be encountered is PB0 and therefore the branch prediction for PB0 is selected by the branch prediction mechanism. Similarly, if the offset of the fetch address identifies a byte within second region 310, the appropriate branch prediction is the branch prediction for PB1. Finally, if the offset of the fetch address identifies a byte within third region 312, then there is no predicted-taken branch instruction within the group of instruction bytes and subsequent to the identified byte. Therefore, the branch prediction for third region 312 is sequential. The sequential address identifies the group of instruction bytes which immediately follows group 310 within main memory.

As described above, the offset of an address comprises a number of least significant bits of the address. The number is sufficient to provide different encodings of the bits for each byte within the group of bytes to which the offset relates. For example, group 300 is 16 bytes. Therefore, four least significant bits of an address within the group form the offset of the address. The remaining bits of the address identify group 300 from other groups of instruction bytes within the main memory. Additionally, a number of the remaining bits form an index used by instruction cache 16 to select a row of storage locations which are eligible for storing group 300.

Set 302 is an exemplary set of branch selectors for group 300. One branch selector is included for each byte within group 300. The branch selectors within set 302 use the encoding shown in FIG. 7 below. In the example, the branch prediction for PB0 is stored as the second of two branch predictions associated with group 300 (as indicated by a branch selector value of "3"). Therefore, the branch selector for each byte within first region 308 is set to "3". Similarly, the branch prediction for PB1 is stored as the first of the branch predictions (as indicated by a branch selector value of "2"). Therefore, the branch selector for each byte within second region 310 is set to "2". Finally, the sequential branch prediction is indicated by the branch selectors for bytes within third region 312 by a branch selector encoding of "0".

It is noted that, due to the variable byte length nature of the x86 instruction set, a branch instruction may begin within one group of contiguous instruction bytes and end within a second group of contiguous instruction bytes. In such a case, the branch prediction for the branch instruction is stored with the second group of contiguous instruction bytes. Among other things, the bytes of the branch instruction which are stored within the second group of contiguous instruction bytes need to be fetched and dispatched. Forming the branch prediction in the first group of contiguous instruction bytes would cause the bytes of the branch instruction which lie within the second group of instruction bytes not to be fetched.

Figure 6:
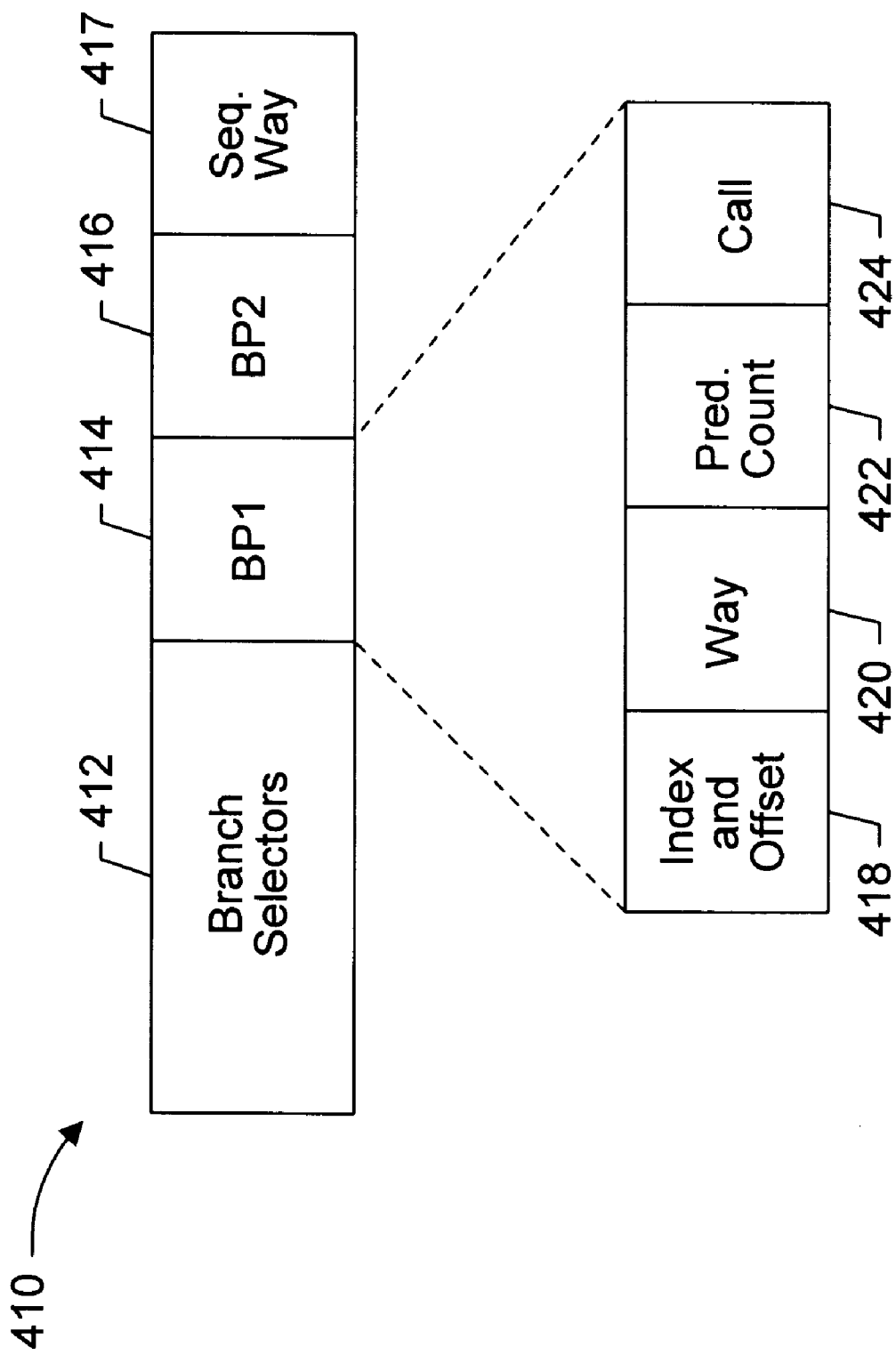
FIG. 6 is a diagram of an exemplary prediction block employed by one embodiment of the branch prediction unit shown in FIG. 4.

Turning now to FIG. 6, an exemplary prediction block 410 employed by one embodiment of the branch prediction unit 14 as shown in FIG. 4 is shown. Prediction block 410 includes a set of branch selectors 412, a first branch prediction (BP1) 414, a second branch prediction (BP2) 416, and a sequential way 417. Set of branch selectors 412 includes a branch selector for each byte of the group of contiguous instruction bytes corresponding to prediction block 410.

As described above, a branch selector is selected from branch prediction block 410 in response to the offset of the first instruction byte fetched from within the group of contiguous instruction bytes corresponding to branch prediction block 410. The branch selector can choose a sequential execution path, a return stack execution path (corresponding to a return instruction), or one or more taken-branch paths. Branch prediction block 410 includes information to generate the sequential and taken-branch paths, while the return stack index, offset, and way are provided to branch prediction generation unit 240 as shown above.

If a given branch selector identifies a sequential execution path, sequential way 417 may be employed by instruction fetch address select unit 103 in generating the next access to the instruction cache. Instruction fetch address select unit 103 calculates the next index from the last index used to address the cache when a sequential prediction is indicated by predicted branch selector 246. For example, if the number of contiguous instruction bytes corresponding to branch prediction block 410 is equal to the cache line size of instruction cache 16, then the next index presented to instruction cache 16 to obtain the next sequential address is simply the next index. The exception to this is the case in which the last index identifies the last row within the cache; in this case, the next index should address the first row within the cache.

First branch prediction 414 is shown in an exploded view in FIG. 6. Second branch prediction 416 is configured similarly. First branch prediction 414 includes an index and offset address 418 for the cache line containing the target address, and a way selection 420 for the cache line as well. Index and offset address 418 is concatenated with the tag of the way indicated by way selection 420 to form the branch prediction address. Additionally, a prediction counter 422 is stored for each branch prediction. The prediction counter is incremented each time the corresponding branch instruction is executed and is taken, and is decremented each time the corresponding branch instruction is executed and is not-taken. The most significant bit of the prediction counter is used as the taken/not-taken prediction. If the most significant bit is set, the branch instruction is predicted taken. Conversely, the branch instruction is predicted not-taken if the most significant bit is clear. In one embodiment, the prediction counter is a two bit saturating counter. The counter saturates when incremented at binary '11' and saturates when decremented at a binary '01'. In another embodiment, the prediction counter is a single bit which indicates a strong (a binary one) or a weak (a binary zero) taken prediction. If a strong taken prediction is mispredicted, it becomes a weak taken prediction. If a weak taken prediction is mispredicted, the branch becomes predicted not taken and the branch selector is updated (i.e. the case of a mispredicted branch that becomes not-taken). Finally, a call bit 424 is included in first branch prediction 414. Call bit 424 is indicative, when set, that the corresponding branch instruction is a subroutine call instruction. If call bit 424 is set, the current fetch address and way are stored into the return stack structure mentioned above.

Turning next to FIG. 7, a table 500 illustrating an exemplary branch selector encoding is shown. A binary encoding is listed (most significant bit first), followed by the branch prediction which is selected when the branch selector is encoded with the corresponding value. As table 500 illustrates, the various branch predictions are advantageously encoded such that the branch selector bits can be used to control the multiplexing of the predicted index and offset 242 and predicted way 244. This will be described below with reference to FIG. 8.

Figure 8:
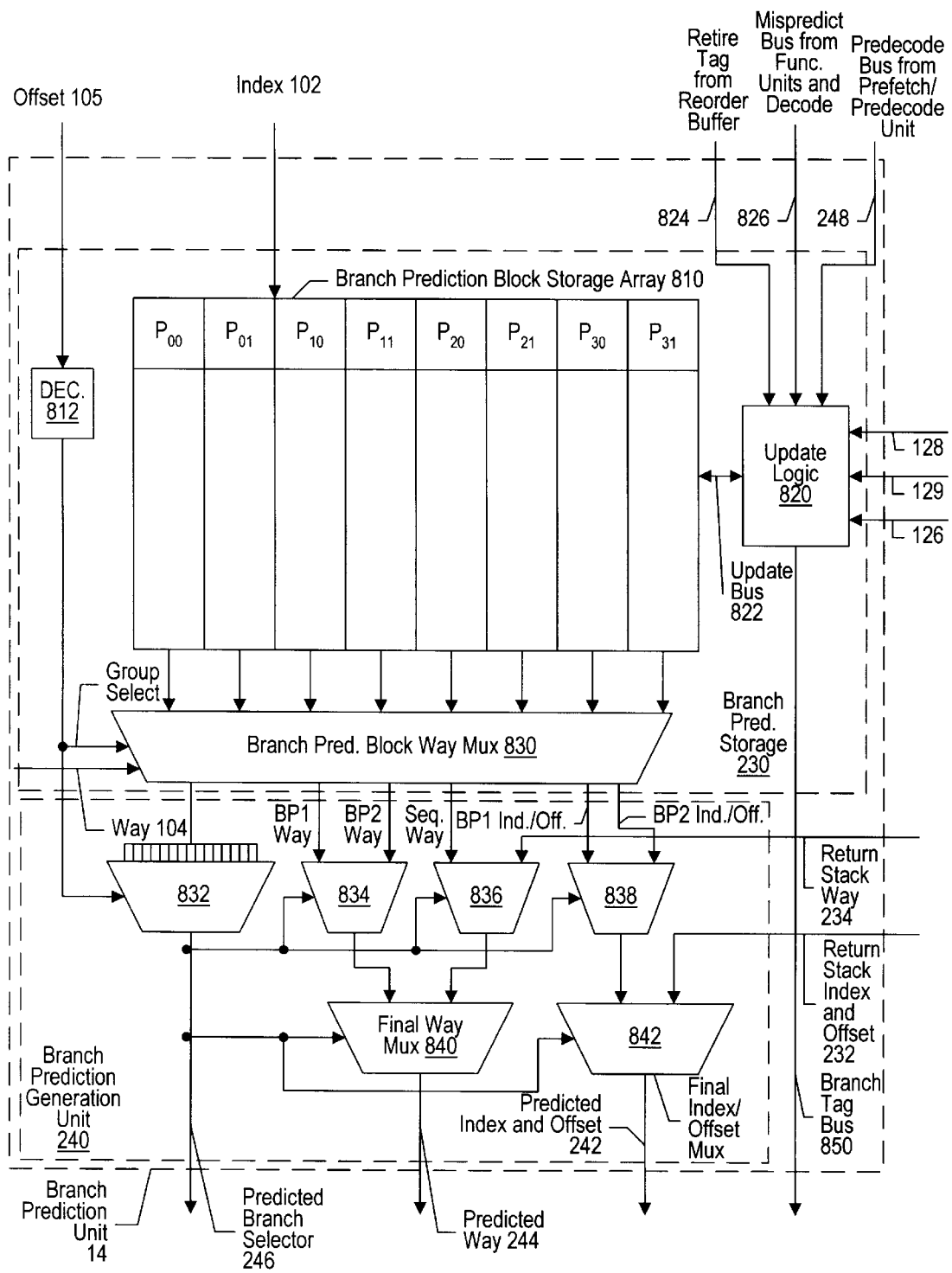
FIG. 8 is a block diagram of a portion of one embodiment of the branch prediction unit shown in FIG. 1.

Turning now to FIG. 8, a portion of one embodiment of branch prediction unit 14 is shown. Other embodiments of branch prediction unit 14 and the portion shown in FIG. 4 are contemplated. As shown in FIG. 8, branch prediction unit 14 includes branch prediction storage 230 and branch prediction generation unit 240. Branch prediction storage 230 includes a branch prediction block storage array 810, a branch prediction block way multiplexer 830, a decoder 812, and an update logic block 820. Branch prediction generation unit 240 includes a branch selector multiplexer 832, a branch prediction way multiplexer 834, a sequential/return way multiplexer 836, a branch prediction index/offset multiplexer 838, a final way multiplexer 840, and a final index/offset multiplexer 842. Branch prediction block storage array 810 is coupled to index 102, while decoder 812 is coupled to offset 105 from instruction fetch address select unit 103. Index 102 is also provided concurrently to instruction tags 110, instruction storage 112, and predecode storage 214. Decoder block 812 provides selection controls to branch selector multiplexer 832. Prediction controls for branch prediction block way multiplexer 830 are provided via way 104 from instruction fetch address select unit. Way 104 is also provided concurrently to instruction tags 110, instruction storage 112, and predecode storage 214. Additional selection control to multiplexer 830 is provided by decoder 812 based upon which portion of the cache line is being fetched. Branch prediction block way multiplexer 830 is coupled to receive the contents of each storage location within the row of branch prediction block storage array 810 which is selected by index 102. Branch selector multiplexer 832, branch prediction way multiplexer 834, sequential/return way multiplexer 836, and branch prediction index/offset multiplexer 838 are all coupled to receive portions of the output of branch prediction block way multiplexer 830 as inputs. Additionally, the output of branch selector multiplexer 832, predicted branch selector 246, provides selection controls for multiplexers 834, 836, 838, 840, and 842. Branch prediction index/offset multiplexer 838 and branch prediction way multiplexer 834 select between two different branch predictions and provide a index and way to final way multiplexer 840 and final index/offset multiplexer 842, respectively. Similarly, sequential/return way multiplexer selects a way prediction to be provided to multiplexer 840. Since a sequential index is not generated by branch prediction generation unit 240, there is no sequential/return index multiplexer. Predicted branch selector 246 provides further selection controls for multiplexers 840 and 842, which provide predicted way 244 and predicted index and offset 242 to instruction fetch address select unit 103, respectively. Predicted index and offset 242 and predicted way 244 are used by instruction fetch address select unit 103 to access instruction cache 16 in a subsequent clock cycle. Update logic block 820 is coupled to branch prediction block storage array 810 via an update bus 822 employed to update branch prediction information stored therein. Update logic block 820 receives additional signals that indicate that updates to branch prediction block storage array 810 are performed. Additionally, update logic block 820 conveys branch tag bus 850 as an output.

Branch prediction block storage array 810 is arranged with a number of ways equal to the number of ways in instruction cache 16. For each way, a prediction block is stored for each group of contiguous instruction bytes existing within a cache line. In the embodiment of FIG. 8, two groups of instruction bytes are included in each cache line. Therefore, prediction block $P_{00}$ is the prediction block corresponding to the first group of contiguous instruction bytes in the first way and prediction block $P_{01}$ is the prediction block corresponding to the second group of contiguous instruction bytes in the first way. Similarly, prediction block $P_{10}$ is the prediction block corresponding to the first group of contiguous instruction bytes in the second way and prediction block $P_{11}$ is the prediction block corresponding to the second group of contiguous instruction bytes in the second way, etc. Each prediction block $P_{00}$ to $P_{31}$ in the indexed row is provided as an output of branch prediction block storage array 810, and hence as an input to branch prediction block way multiplexer 830. In the embodiment of FIG. 8, the indexing into branch prediction block storage array 810 is done similarly to the indexing into instruction storage 112, since branch prediction block storage array 810 is configured with an identical number of rows as instruction storage 112. It is noted that branch prediction block storage array 810 may be configured with fewer rows than instruction cache 16. For example, branch prediction block storage array 810 may include ¼ the number of rows of instruction cache 16. In such a case, the address bits which are index bits of instruction cache 16 but which are not index bits of branch prediction block storage array 810 may be stored with the branch prediction information and checked against the corresponding bits of the fetch address to confirm that the branch prediction information is associated with the row of instruction cache 16 which is being accessed.

Branch prediction block way multiplexer 830 selects one of the sets of branch prediction information $P_{00}$–$P_{31}$ based upon way 104, offset 105, and index 102 provided by instruction fetch address select unit 103. In the embodiment shown, for example, a 32 byte cache line is divided into two 16 byte groups. Therefore, the fifth least significant bit of the address is used to select which of the two groups within the selected way contains the fetch address. If the fifth least significant bit is zero, then the first group of contiguous instruction bytes is selected. If the fifth least significant bit is one, then the second group of contiguous instruction bytes is selected.

The selected prediction block provided by branch prediction block way multiplexer 830 includes branch selectors for each byte in the group of contiguous instruction bytes, as well as a sequential way prediction and branch predictions BP1 and BP2. The branch selectors are provided to branch selector multiplexer 832, which selects one of the branch selectors based upon selection controls provided by decoder 812. Decoder 812 decodes offset 105 to select the corresponding branch selector. For example, if a group of contiguous instruction bytes is 16 bytes, then decoder 812 decodes the four least significant bits of the fetch address. In this manner, a branch selector is chosen.

The selected branch selector is used to provide selection controls to branch prediction way multiplexer 834, sequential/return way multiplexer 836, branch prediction index/offset multiplexer 838, final way multiplexer 840, and final index/offset multiplexer 842. In one embodiment, the encoding of the branch selector can be used directly as the multiplexer select controls. In other embodiments, a logic block may be inserted between branch selector multiplexer 832 and multiplexers 834, 836, 838, 840, and 842. For the embodiment shown, branch selectors comprise two bits. The least significant bit of predicted branch selector 246 provides selection control for branch prediction way multiplexer 834, sequential/return way multiplexer 836, and branch prediction index/offset multiplexer 838. The most significant bit provides a selection control for final way multiplexer 840 and final index/offset multiplexer 842. A branch prediction comprising predicted index and offset 242 and predicted way 244 is thereby selected from the multiple branch predictions stored in branch prediction block storage array 810 corresponding to the group of contiguous instruction bytes being fetched. It is noted that other embodiments of multiplexers may be used to select predicted index and offset 242 and predicted way 244.

The return stack structure (not shown) is used to store return addresses corresponding to subroutine call instructions previously fetched by microprocessor 10. In one embodiment, the branch predictions stored by branch prediction block storage array 810 include an indication that the branch prediction corresponds to a subroutine call instruction. Subroutine call instructions are a subset of branch instructions which save the address of the sequential instruction (the return address) in addition to redirecting the instruction stream to the target address of the subroutine call instruction. For example, the in the x86 microprocessor architecture, the subroutine call instruction (CALL) pushes the return address onto the stack indicated by the ESP register.

A subroutine return instruction is another subset of the branch instructions. The subroutine return instruction uses the return address saved by the most recently executed subroutine call instruction as a target address. Therefore, when a branch prediction includes an indication that the branch prediction corresponds to a subroutine call instruction, the sequential address to the subroutine call instruction is placed at the top of the return stack. When a subroutine return instruction is encountered (as indicted by a particular branch selector encoding), the address nearest the top of the return stack which has not previously been used as a prediction is used as the prediction of the address. The address nearest the top of the return stack which has not previously been used as a prediction is conveyed by the return stack as return stack index and offset 232 and return stack way 234. Branch prediction unit 14 informs the return stack when the return address is selected as the prediction.

Update logic block 820 is configured to update a prediction block upon detection of a sequential way misprediction, a branch misprediction, predecode information from prefetch/predecode unit 12, or a correctly predicted branch. The prediction block corresponding to each branch prediction is stored in update logic block 820 as the prediction is performed. A branch tag is conveyed along with the instructions being fetched (via branch tag bus 850), such that if a misprediction is detected or a branch instruction is detected during predecoding, the corresponding prediction block can be identified via the branch tag. In one embodiment, the prediction block as shown in FIG. 6 is stored, as well as the index of the fetch address which causes the prediction block to be fetched and the way in which the prediction block is stored.

When a sequential way misprediction is detected, the sequential way field in the branch prediction block corresponding to the previous instruction fetch is updated. As described above, tag hit logic 120 detects a mispredicted sequential access, and asserts actual way 126, along with update index 128 and update way 129. Update logic block 820 uses the way value conveyed on actual way 126 to update the sequential way field of the branch prediction block selected by update index 128 and update way 129. Concurrently with the branch prediction block update, the instruction fetch is retried to the correct way as described above.

When a branch misprediction is detected, the corresponding branch tag is provided upon mispredict bus 826 from either the functional unit 24 which executes the branch instruction or from decode units 20. If decode units 20 provide the branch tag, then the misprediction is of the previously undetected type (e.g. there are more branch instructions in the group than can be predicted using the corresponding branch predictions). Decode units 20 detect mispredictions of unconditional branch instructions (i.e. branch instructions which always select the target address). Functional units 24 may detect a misprediction due to a previously undetected conditional branch instruction or due to an incorrect taken/not-taken prediction. Update logic 820 selects the corresponding prediction block out of the aforementioned storage. In the case of a previously undetected branch instruction, one of the branch predictions within the prediction block is assigned to the previously undetected branch instruction. According to one embodiment, the algorithm for selecting one of the branch predictions to store the branch prediction for the previously undetected branch instruction is as follows: If the branch instruction is a subroutine return instruction, the branch selector for the instruction is selected to be the value indicating the return stack. Otherwise, a branch prediction which is currently predicted not-taken is selected. If each branch prediction is currently predicted-taken, then a branch prediction is randomly selected. The branch selector for the new prediction is set to indicate the selected branch prediction. Additionally, the branch selectors corresponding to bytes between the first branch instruction prior to the newly detected branch instruction and the newly detected branch instruction are set to the branch selector corresponding to the new prediction. One method for updating the branch selectors is described below. For a mispredicted taken prediction which causes the prediction to become predicted not-taken, the branch selectors corresponding to the mispredicted prediction are set to the branch selector corresponding to the byte subsequent to the mispredicted branch instruction. In this manner, a prediction for a subsequent branch instruction will be used if the instructions are fetched again at a later clock cycle.

When prefetch/predecode unit 12 detects a branch instruction while predecoding a group of contiguous instruction bytes, prefetch/predecode unit 12 provides the branch tag for the group of contiguous instruction bytes if the predecoding is performed because invalid predecode information is stored in the instruction cache for the cache line (case (i)). Alternatively, if the predecoding is being performed upon a cache line being fetched from the main memory subsystem, prefetch/predecode unit 12 provides the address of the group of contiguous instruction bytes being predecoded, the offset of the end byte of the branch instruction within the group, and the way of the instruction cache selected to store the group (case (ii)). In case (i), the update is performed similar to the branch misprediction case above. In case (ii), there is not yet a valid prediction block stored in branch prediction storage 230 for the group of instructions. For this case, update logic block 820 initializes the branch selectors prior to the detected branch to the branch selector selected for the detected branch. Furthermore, the branch selectors subsequent to the detected branch are initialized to the sequential value. Alternatively, each of the branch selectors may be initialized to sequential when the corresponding cache line in instruction cache 16 is allocated, and subsequently updated via detection of a branch instructions during predecode in a manner similar to case (i).

In one embodiment, prefetch/predecode unit 12 can also perform initialization of the sequential way field within a branch prediction block corresponding to a group of contiguous instruction bytes within instruction cache 16. In a first case, a first group of contiguous instruction bytes is stored in instruction cache 16, and the next instruction access is predicted to follow a sequential execution path. If the next instruction access misses in instruction cache 16, a second group of contiguous instruction bytes corresponding to the miss address are fetched from main memory. When this access to main memory is complete, prefetch/predecode unit 12 stores the fetched instruction bytes to instruction storage 112. The sequential way field of the branch prediction block corresponding to the first group of contiguous instruction bytes may be updated accordingly. In a second case, consider an embodiment of prefetch/predecode unit in which a instruction cache miss initiates a request not only for the second group of contiguous instruction bytes corresponding to the miss address in the above example, but also a third group of contiguous bytes sequentially following the second group. In such an embodiment, the sequential way field of the branch prediction block corresponding to the second group of contiguous instruction bytes may be updated after storing the third group to a selected way within instruction storage 112. In a third case, consider a branch instruction with a target address that misses in instruction cache 16. When a fourth group of contiguous instruction bytes corresponding to the target of the branch instruction is retrieved from memory, it will be placed into a way within instruction storage 112. In this case, however, the sequential way field may not be updated since the location of the group of contiguous instruction bytes preceding the fourth group is unknown (due to the fact that the fourth group was not executed as part of a sequential execution path). In fact, the preceding group may not even be present in instruction cache 16 at the time the target of the branch instruction is retrieved.

Upon generation of an update, update logic block 820 conveys the updated prediction block, along with the fetch address index and corresponding way, upon update bus 822 for storage in branch prediction block storage array 810. It is noted that, in order to maintain branch prediction block storage array 810 as a single ported storage, branch prediction block storage array 810 may employ a branch holding register. The updated prediction information is stored into the branch holding register and updated into the branch prediction storage upon an idle cycle on index 102.

It is noted that a correctly predicted branch instruction may result in an update to the corresponding branch prediction as well. A counter indicative of previous executions of the branch instruction (used to form the taken/not-taken prediction of the branch instruction) may need to be incremented or decremented, for example. Such updates are performed upon retirement of the corresponding branch prediction. Retirement is indicated via a branch tag upon retire tag bus 824 from reorder buffer 32.

Figure 9:
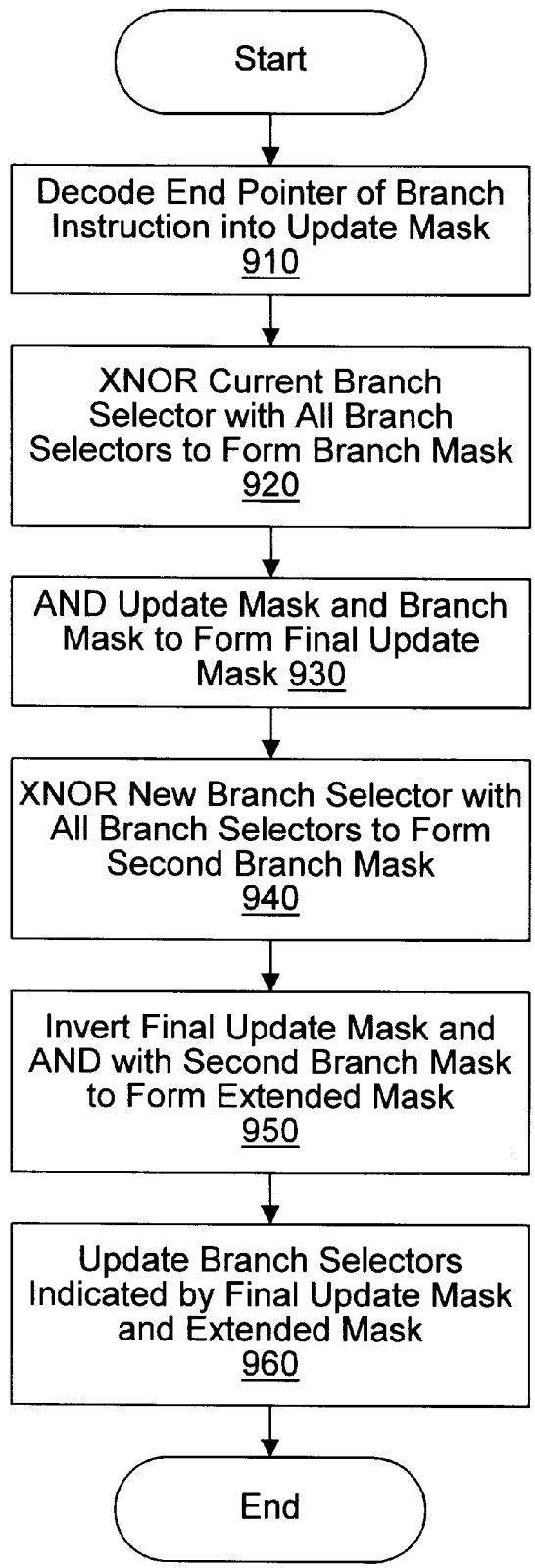
FIG. 9 is a flowchart depicting steps performed in order to update a set of branch selectors corresponding to a group of contiguous instruction bytes.

Turning now to FIG. 9, a flow chart depicting the steps employed to update the branch selectors of a group of contiguous instruction bytes in response to a mispredicted branch instruction is shown. Updating due to a branch instruction discovered during predecoding may be performed similarly. The misprediction may be the result of detecting a branch instruction for which prediction information is not stored in branch prediction block storage array 810, or may be the result of an incorrect taken/not-taken prediction which causes the corresponding prediction counter to indicate not-taken.

Upon detection of the misprediction, branch prediction unit 14 uses an "end pointer": the offset of the end byte of the mispredicted branch instruction within the corresponding group of contiguous instruction bytes. Additionally, the prediction block is selected for update using the branch tag received in response to the misprediction. Branch prediction unit 14 decodes the end pointer into an update mask (step 910). The update mask comprises a binary digit for each byte within the group of continuous instruction bytes. Digits corresponding to bytes prior to and including the end byte of the branch instruction within the cache line are set, and the remaining digits are clear.

Branch prediction unit 14 identifies the current branch selector. For mispredicted taken/not-taken predictions, the current branch selector is the branch selector corresponding to the mispredicted branch instruction. For misprediction due to an undetected branch, the current branch selector is the branch selector corresponding to the end byte of the undetected branch instruction. The current branch selector is XNOR'd with each of the branch selectors to create a branch mask (step 920). The branch mask includes binary digits which are set for each byte having a branch selector which matches the current branch selector and binary digits which are clear for each byte having a branch selector which does not match the current branch selector.

The update mask created in step 910 and the branch mask created in step 920 are subsequently ANDed, producing a final update mask (step 930). The final update mask includes binary digits which are set for each byte of the group of contiguous instruction bytes which is to be updated to the new branch selector. For a mispredicted taken branch, the new branch selector is the branch selector of the byte subsequent to the end byte of the mispredicted taken branch instruction. For an undetected branch, the new branch selector is the branch selector indicating the branch prediction storage assigned to the previously undetected branch by update logic block 820.

An extended mask is also generated (steps 940 and 950). The extended mask indicates which branch selectors are to be erased because the branch prediction corresponding to the branch selector has been reallocated to the newly discovered branch instruction or because the branch prediction now indicates not taken. The extended mask is generated by first creating a second branch mask similar to the branch mask, except using the new branch selector instead of the current branch selector (i.e. the mask is created by XNORing the branch selectors corresponding to the cache line with the new branch selector (step 940)). The resulting mask is then ANDed with the inversion of the final update mask to create the extended mask (step 950). Branch selectors corresponding to bits in the extended mask which are set are updated to indicate the branch selector of the byte immediately subsequent to the last byte for which a bit in the extended mask is set. In this manner, the branch prediction formerly indicated by the branch selector is erased and replaced with the following branch selector within the cache line. During a step 960, the branch selectors are updated in response to the final update mask and the extended mask.

Figure 10:
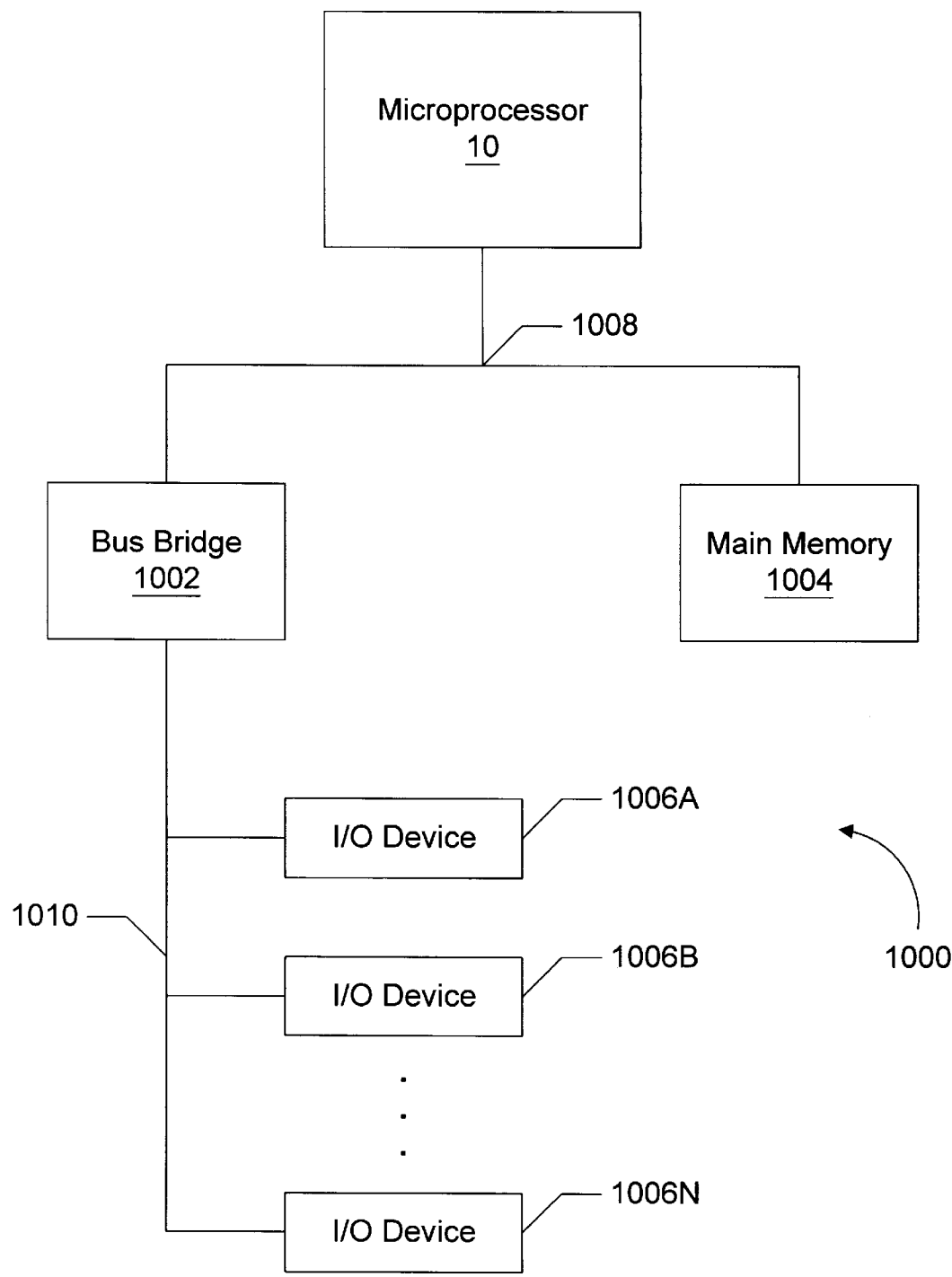
FIG. 10 is a block diagram of a computer system including the microprocessor shown in FIG. 1.

Turning now to FIG. 10, a computer system 1000 including microprocessor 10 is shown. Computer system 1000 further includes a bus bridge 1002, a main memory 1004, and a plurality of input/output (I/O) devices 1006A–1006N. Plurality of I/O devices 1006A–1006N will be collectively referred to as I/O devices 1006. Microprocessor 10, bus bridge 1002, and main memory 1004 are coupled to a system bus 1008. I/O devices 1006 are coupled to an I/O bus 1010 for communication with bus bridge 1002.

Bus bridge 1002 is provided to assist in communications between I/O devices 1006 and devices coupled to system bus 1008. I/O devices 1006 typically require longer bus clock cycles than microprocessor 10 and other devices coupled to system bus 1008. Therefore, bus bridge 1002 provides a buffer between system bus 1008 and input/output bus 1010. Additionally, bus bridge 1002 translates transactions from one bus protocol to another. In one embodiment, input/output bus 1010 is an Enhanced Industry Standard Architecture (EISA) bus and bus bridge 1002 translates from the system bus protocol to the EISA bus protocol. In another embodiment, input/output bus 1010 is a Peripheral Component Interconnect (PCI) bus and bus bridge 1002 translates from the-system bus protocol to the PCI bus protocol. It is noted that many variations of system bus protocols exist. Microprocessor 10 may employ any suitable system bus protocol.

I/O devices 1006 provide an interface between computer system 1000 and other devices external to the computer system. Exemplary I/O devices include a modem, a serial or parallel port, a sound card, etc. I/O devices 1006 may also be referred to as peripheral devices. Main memory 1004 stores data and instructions for use by microprocessor 10. In one embodiment, main memory 1004 includes at least one Dynamic Random Access Memory (DRAM) and a DRAM memory controller.

It is noted that although computer system 1000 as shown in FIG. 11 includes one bus bridge 1002, other embodiments of computer system 1000 may include multiple bus bridges 1002 for translating to multiple dissimilar or similar I/O bus protocols. Still further, a cache memory for enhancing the performance of computer system 1000 by storing instructions and data referenced by microprocessor 10 in a faster memory storage may be included. The cache memory may be inserted between microprocessor 10 and system bus 1008, or may reside on system bus 1008 in a "lookaside" configuration.

Although various components above have been described as multiplexers, it is noted that multiple multiplexers, in series or in parallel, may be employed to perform the selection represented by the multiplexers shown.

It is still further noted that the present discussion may refer to the assertion of various signals. As used herein, a signal is "asserted" if it conveys a value indicative of a particular condition. Conversely, a signal is "de-asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTC | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |

TABLE 1-continued x86 Fast Path, Double Dispatch, and MROM Instructions

| X86 Instruction | Instruction Category |
| --- | --- |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |

TABLE 1-continued x86 Fast Path, Double Dispatch, and MROM Instructions

| X86 Instruction | Instruction Category |
| --- | --- |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

In accordance with the above disclosure, an instruction cache way prediction mechanism for sequential accesses is described. Each group of contiguous instruction bytes within the instruction cache has a branch prediction block associated with it which includes a predicted value of a way for a sequential access. If a sequential execution path is selected, this predicted way value is supplied to instruction cache in a succeeding cycle. This way prediction mechanism may allow quicker access to a set associative cache.

It is noted that other embodiments of the way prediction mechanism described above may be employed. In one embodiment, only the predicted way for a given index is accessed in a given cycle. If a tag mismatch occurs, then another access is performed to all ways at the given index. This access will determine if the way was mispredicted or if the accessed missed in the instruction cache. It is contemplated that such an embodiment may be useful for low-power applications.

It is further noted that in an alternate embodiment, sequential way prediction information may be implemented without corresponding branch prediction information. In one such embodiment, branch prediction information may not be employed, yet sequential way prediction information may still be incorporated within instruction cache 16.

Numerous variations and modifications will become apparent to those skilled in the art once the above disclosure is fully appreciated. It is intended that the following claims be interpreted to embrace all such variations and modifications.

What is claimed is:

1. A microprocessor comprising:
an instruction cache configured to store a plurality of cache lines of instruction bytes and to provide a first group of instruction bytes upon receipt of a first index address and a first way address in a first clock cycle, to an instruction processing pipeline of said microprocessor;
a branch prediction unit coupled to said instruction cache and coupled to receive said first index address and said first way address concurrent with said instruction cache, wherein said branch prediction unit is configured to provide a sequential way corresponding to said first group of instruction bytes in response to said first index address and said first way address, and wherein said sequential way is used as a subsequent way address by said instruction cache in response to a branch prediction algorithm predicting a sequential execution path; and
wherein the instruction cache is configured to provide a second group of instruction bytes to the instruction processing pipeline of said microprocessor upon receipt of a second index and a second way in a second clock cycle succeeding said first clock cycle, wherein said second way is selected to be said sequential way.

2. The microprocessor of claim 1, wherein said branch prediction unit is configured to provide a predicted way in response to said first index address and said way address, and wherein said predicted way is used as said subsequent first way address by said instruction cache in response to said branch prediction unit predicting a non-sequential execution path.

3. The microprocessor of claim 2, wherein said branch prediction unit is configured to provide a predicted index in response to said first index address and said first way address, and wherein said predicted index is used as a subsequent index address by said instruction cache in response to said branch prediction unit predicting a non-sequential execution path.

4. The microprocessor of claim 1, further comprising:

an instruction fetch unit coupled to said instruction cache and said branch prediction unit, wherein said instruction fetch unit is configured to convey said first index address and said first way address to said instruction cache, and wherein said instruction fetch unit is configured to receive said sequential way from said branch prediction unit.

5. The microprocessor of claim 4, wherein said branch prediction unit is configured to provide a predicted first index in response to receiving said index address and said first way address, wherein said instruction fetch unit is configured to convey a subsequent index address to said instruction cache in response to receiving said predicted index from said branch prediction unit.

6. The microprocessor of claim 5, wherein said subsequent index address is selected based on said predicted index in response to said branch prediction unit predicting a non-sequential execution path.

7. The microprocessor of claim 5, wherein said instruction fetch unit is configured to calculate said subsequent index address based on said first index address in response to said branch prediction unit predicting a sequential execution path.

8. The microprocessor of claim 5, wherein said branch prediction unit is configured to convey a predicted branch selector to said instruction fetch unit, wherein said instruction fetch unit is configured to select said subsequent index address based on said predicted branch selector.

9. A method of fetching instructions from an instruction cache comprising:

conveying a first index and a first way from a control unit to said instruction cache in a first clock cycle;

selecting a first group of contiguous instruction bytes within said instruction cache based on said first index and said first way;

conveying said first index and said first way to a branch prediction storage in said first clock cycle;

conveying a branch prediction block including a predicted sequential way value from said branch prediction storage to said control unit in response to receiving said first index and said first way;

conveying a second index and a second way from said control unit to said instruction cache in a second clock cycle succeeding said first clock cycle;

selecting a second group of contiguous instruction bytes within said instruction cache based on said second index and said second way;

selecting said predicted sequential way value to be said second way in response to a branch prediction algorithm employed by said control unit predicting a sequential execution path.

10. The method of claim 9, further comprising:

selecting an index immediately following said first index to be said second index in response to said branch prediction algorithm predicting said sequential execution path.

11. The method of claim 9, further comprising:

conveying a third way from a prefetch unit to said instruction cache; and storing a third group of contiguous instruction bytes fetched from main memory to an instruction cache location selected by said third index and said third way.

12. The method of claim 1, further comprising:

storing a value indicating said third way to said predicted sequential way value within a branch prediction block corresponding to a fourth group of contiguous instruction bytes in said instruction cache;

wherein a starting address of said fourth group of contiguous instruction bytes in main memory is located immediately following an ending address of said third group of contiguous instruction bytes in main memory.

13. The method of claim 9, further comprising:

comparing each of a plurality of tag values corresponding to said second index to an address tag in tag hit logic;

wherein said address tag includes a plurality of most significant bits of a second fetch address corresponding to said second group of contiguous instruction bytes.

14. The method of claim 13, further comprising:

storing an updated value to said predicted sequential way value within said branch prediction block corresponding to said first group of contiguous instruction bytes in a third clock cycle subsequent to said second clock cycle in response to said tag hit logic detecting a hit in a given way corresponding to a group of contiguous instruction bytes other than said second group of contiguous instruction bytes;

wherein said updated value is said given way.

15. The method of claim 9, wherein said branch prediction block further includes branch prediction information employed by said branch prediction algorithm.

16. The method of claim 15, wherein said branch prediction information includes a plurality of branch selectors, each of said plurality of branch selectors corresponding to one of said first group of contiguous instruction bytes, and wherein each of said plurality of branch selectors specifies one of a plurality of branch prediction strategies.

17. The method of claim 16, further comprising:

selecting one of said plurality of branch selectors using said branch prediction algorithm in response to a plurality of least significant bits of a first fetch address corresponding to said first group of contiguous instruction bytes.

18. The method of claim 16, wherein said plurality of branch prediction strategies include predicting a sequential execution path, predicting a return branch path predicting a first taken branch within said first group of contiguous instruction bytes, and predicting a second taken branch within said second group of contiguous instruction bytes.

19. A computer system, comprising:

a microprocessor including:

an instruction cache configured to store a plurality of cache lines of instruction bytes and to provide a first group of instruction bytes upon receipt of a first index address and a first way address in a first clock cycle, to an instruction processing pipeline of said microprocessor;

a branch prediction unit coupled to said instruction cache and coupled to receive said first index address and said first way address concurrent with said instruction cache, wherein said branch prediction unit is configured to provide a sequential way corresponding to said first group of instruction bytes in response to said first index address and said first way address, and wherein said sequential way is used as a subsequent way address by said instruction cache in response to a branch prediction algorithm predicting a sequential execution path;

wherein the instruction cache is configured to provide a second group of instruction bytes to the instruction processing pipeline of said microprocessor upon receipt of a second index and a second way in a second clock cycle succeeding said first clock cycle, wherein said second way is selected to be said sequential way, an input/output (I/O) device coupled to said microprocessor and to another computer system, wherein said I/O device is configured to communicate between said microprocessor and said another computer system.

20. The computer system of claim 19, wherein said I/O device comprises a modem.

* * * * *

UNITED STATES PATENT AND TRADEMARK OFFICE
CERTIFICATE OF CORRECTION

PATENT NO. : 6,101,595
DATED : August 8, 2000
INVENTOR(S) : James K. Pickett and Thang M. Tran It is certified that error appears in the above-identified patent and that said Letters Patent is hereby corrected as shown below:

Claims,

Claim 2, column 29,
Line 7, please add "first" before "way".
Line 9, please change "first way address" to "way address".

Claim 12, column 30,
Line 16, please change "claim 1" to "claim 11".

Signed and Sealed this

Second Day of October, 2001

Attest:

NICHOLAS P. GODICI
Attesting Officer   Acting Director of the United States Patent and Trademark Office